July 26, 1966
W. C. RUDD
3,263,053
TUBE FORMING APPARATUS
Filed Nov. 27, 1964
3 Sheets-Sheet 1
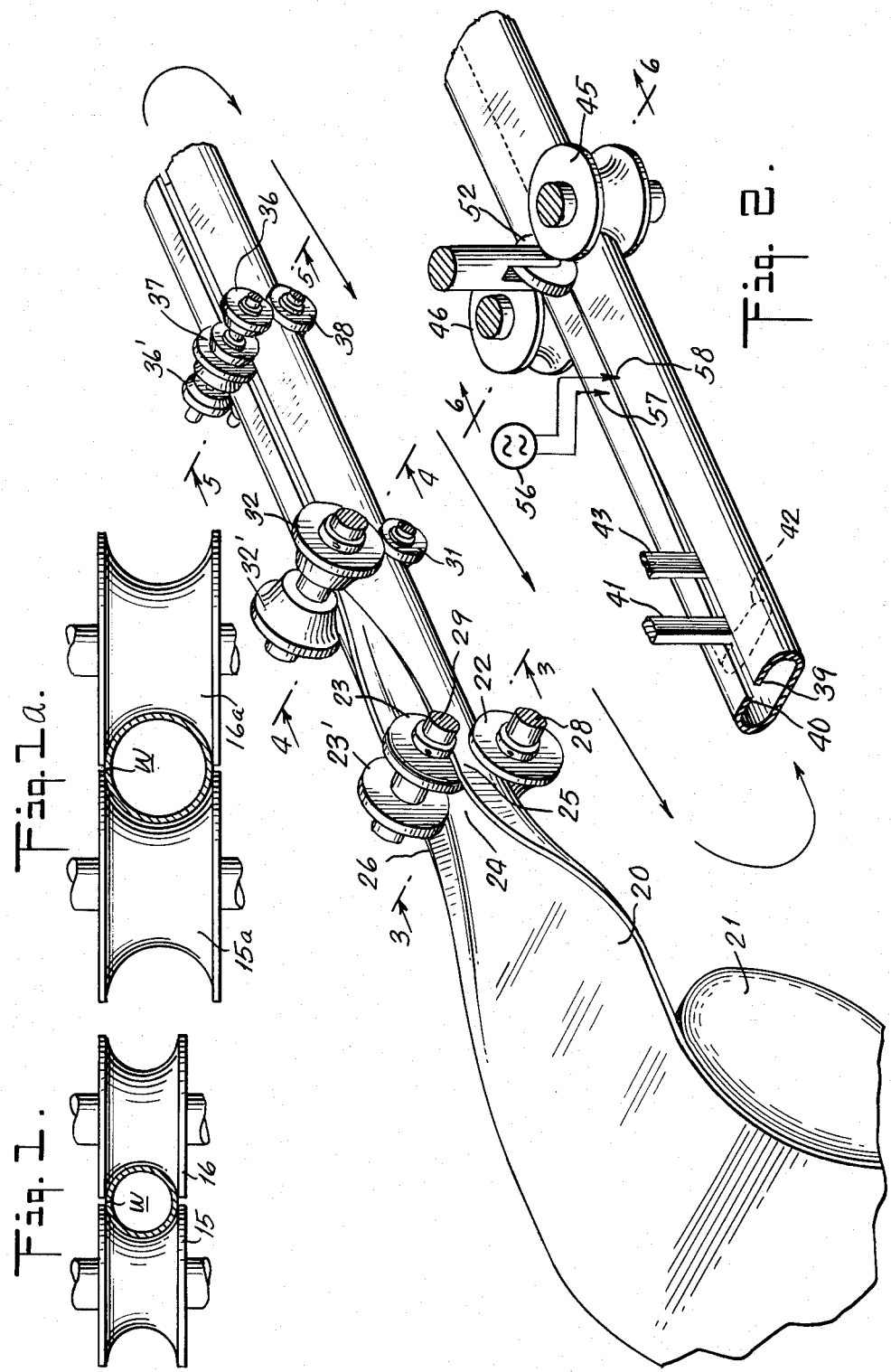

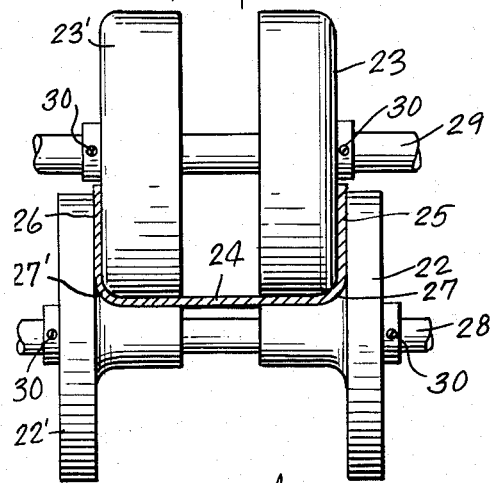
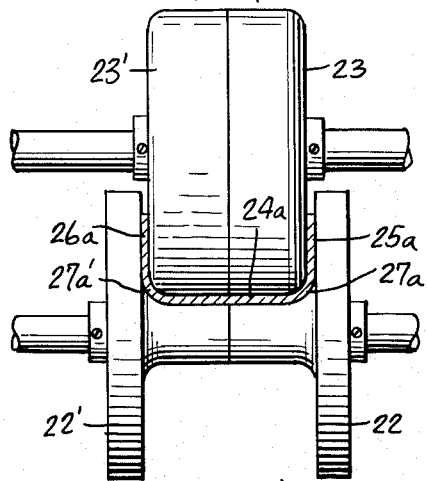
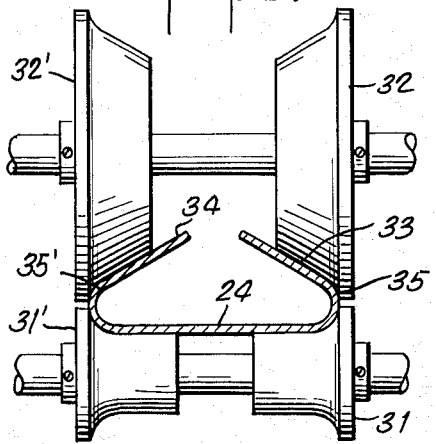
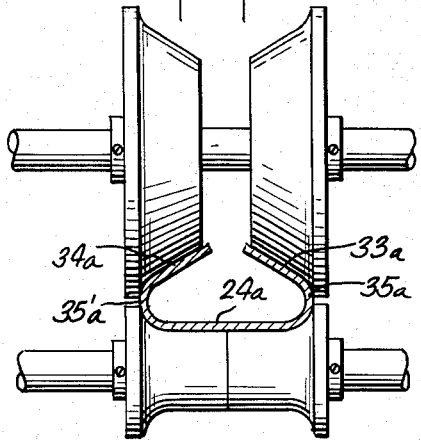
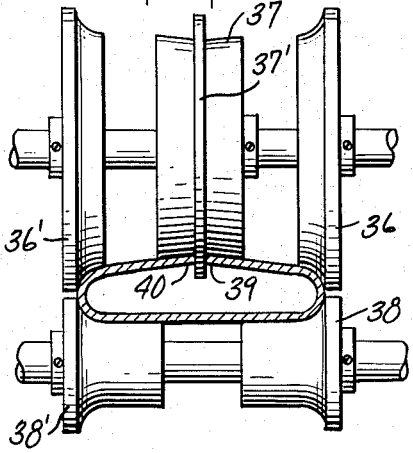
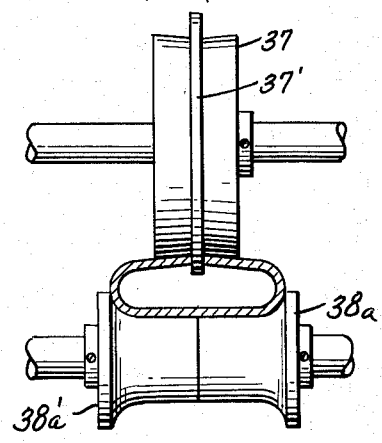

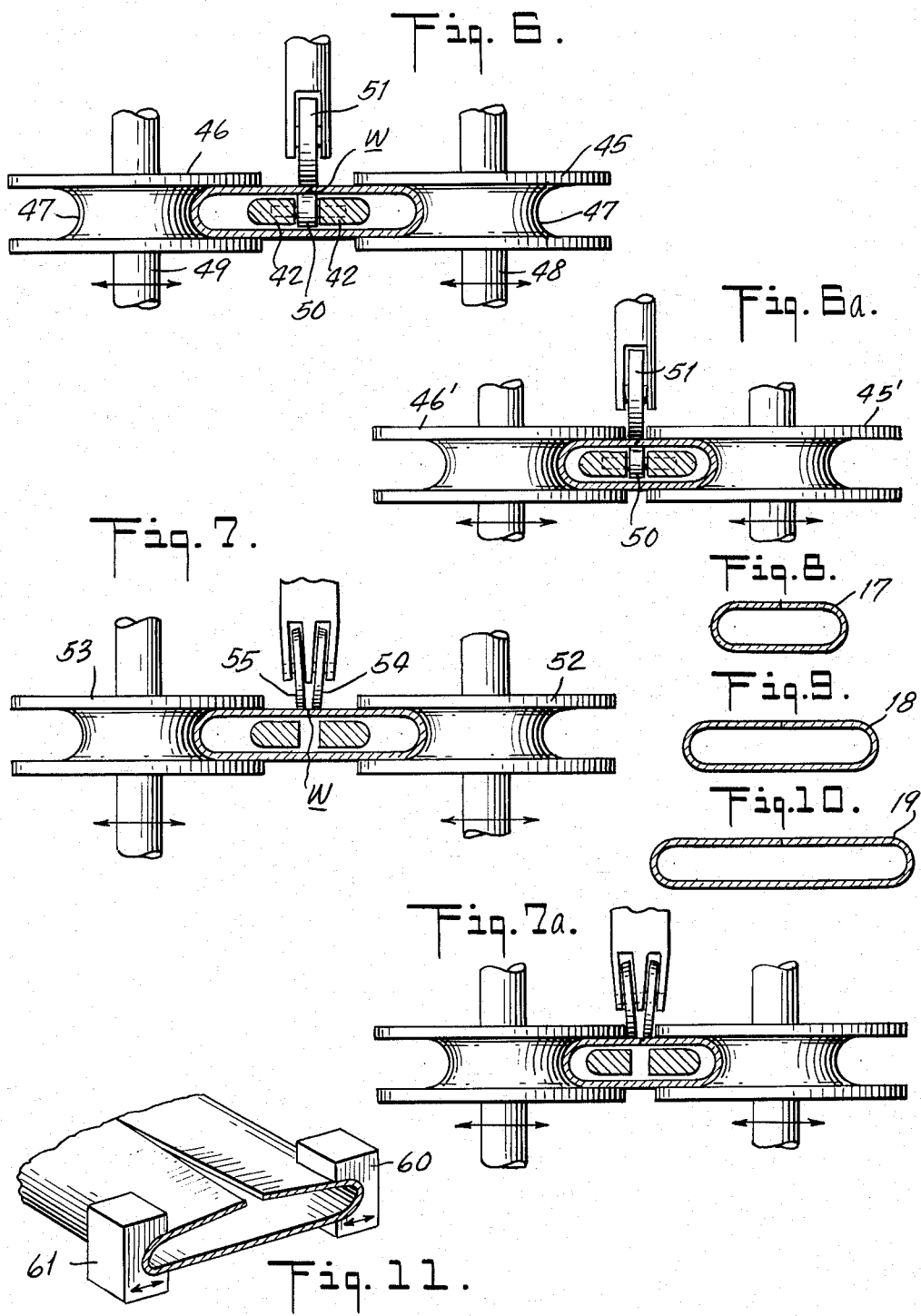

United States Patent Office 3,263,053
Patented July 26, 1966

3,263,053
TUBE FORMING APPARATUS
Wallace C. Rudd, Larchmont, N.Y., assignor to American Machine & Foundry Company, New York, N.Y., a corporation of New Jersey
Filed Nov. 27, 1964, Ser. No. 414,299
6 Claims. (Cl. 219—59)

This invention relates to apparatus adjustable for forming tubing of various sizes, of sheet metal or other flexible sheet material.

In the making of tubing for use in manufacturing can bodies or other purposes, and particularly thin-walled tubing, it has been the general practice to transform an advancing strip of the sheet material into tubing of circular cross-sectional shape by using suitably shaped rolls, and then welding or otherwise forming the longitudinal seam which joins the strip edges. Normally, tube forming mills for such purposes are constructed with interchangeable or replaceable rolls so as to accommodate tubing of a range of different sizes, but since it has been necessary to employ a different set of rolls for tubing of each different diameter, the result has been that, to accommodate many different diameters, a large and costly stock of rolls has had to be maintained. In addition, time had to be consumed in changing all or substantially all of the forming rolls in the mill whenever it was desired to manufacture tubing of a different diameter. That is, if the tubing is to be formed to have a circular cross-section, it is evident that not only the numerous tube forming rolls, but also the pressure-applying rolls at the welding region, will have to have peripheral grooves of such arcuate cross-sections as to accommodate only circular tubing of a particular diameter, such rolls necessarily being replaced by others for forming circular tubing of other diameters.

However, as disclosed in the co-pending application of Jack Morris, Serial No. 411,863, filed November 17, 1964, entitled, "Manufacture of Can Bodies and the Like," reference to which is hereby made, it is not essential that the tubing of flexible sheet material be formed with a circular cross-section, since (and as disclosed in that application) it is advantageous that tube lengths such as for forming can bodies or the like, be initially shaped with non-circular cross-sections, that is, with cross-sections which may be described as of "flattened oval" shape, having the advantage, among possibly others, of facilitating the cutting off of the successive tube lengths.

The present invention makes it possible to provide a tube mill for making tubing or tube lengths of such flattened oval shape, but of a very large number of different sizes (i.e. of cross-sections each having different total perimeters) by the use in the tube mill of only a single set of rolls, including the forming rolls and the rolls at the welding region. This not only makes possible a great saving in the expense for rolls, but also important savings in the change-over time in altering the tube mill to accommodate different tube sizes.

In accordance with the invention, the flattened oval-shaped tubes being formed, will have side portions of substantially semi-circular cross-sections of substantially the same predetermined shape and size, regardless of the total perimeter of the tube cross-section, and the different perimeters are taken care of by providing the upper and lower or opposed flattened portions of different widths. This in turn makes it possible to accommodate tubes of different sizes merely by changing the spacing between the forming and welding rolls, as by slidably adjusting same along their respective supporting shafts or axes, without incurring the time and expense of replacing the rolls, one set for another. This arises from the fact that the important roll surfaces which engage the tubing in forming and welding same, will engage the work at the semi-circular sides of the tubing, which will be of the same shape and radius for the tubes of different sizes.

It will be understood that, although the tubing is formed and welded with a flattened oval cross-sectional shape, yet the tubing of tube lengths may thereafter be expanded without difficulty, to either a circular or other desired cross-sectional shape. The apparatus of the invention is well adapted for use in cases where the welded longitudinal seam is made by utilizing either induction, or high frequency resistance heating, and the seam may be of so-called lapped, mash-lapped type, or butt welded type. The invention is particularly useful in cases where the tube wall material is relatively thin and flexible, although the wall thickness may be as much as one-sixteenth inch, or possibly much more, depending on the size of the desired finished tubing, and whether it is of a material sufficiently flexible to be afterwards readily expanded to the desired cross-sectional shape. The apparatus is particularly desirable for the fabrication of sheet metal can bodies or containers, and even relatively large sheet metal drums. In some cases it will be more economical to form the tubing with a low flattened oval shape by the use of this invention and to supply it for delivery in that shape, which will require less shipping space than tubing of circular cross-section, or other bulky cross-sections. At the place of use, the flattened oval tubing may be expanded by suitable apparatus to reform same to a circular, square or other desired cross-sectional shape. Although different and alternative expanding devices or equipment may be necessary thus to expand the tubing of different sizes and shapes, this will not ordinarily represent a handicap, because at each particular place of use of the tubing, different sizes and shapes usually will not have to be provided for.

Various further and more specific objects, features and advantages of the invention will appear from the description given below, taken in connection with the accompanying drawings, illustrating by way of example preferred forms of the invention.

In the drawings:

FIGS. 1 and 1a show typical rolls as per the prior art, such as the pressure rolls at the region where the tube is welded when same is of the conventional circular cross-section;

FIG. 2 is a somewhat diagrammatic perspective view of apparatus in accordance with the present invention;

FIGS. 3, 4, 5 and 6 are transverse sectional views taken substantially along the correspondingly numbered section lines of FIG. 2; FIGS. 3a, 4a, 5a and 6a are corresponding sectional views showing the same equipment adjusted for forming tubing of a smaller size;

FIGS. 6 and 6a show arrangement of rolls adapted for forming a longitudinal seam in tubing of mashed lapped type;

FIGS. 7 and 7a respectively correspond to FIGS. 6 and 6a, except showing roll arrangements as adapted for making a butt welded seam in the tubing;

FIGS. 8, 9 and 10 are cross-sectional views of tubes of three different sizes having "flattened oval" shapes, which all may be made on the tube mill apparatus of the invention without replacing the rolls to accommodate such different sizes;

FIG. 11 is a somewhat schematic perspective view illustrating the possibility of using forming dies in lieu of rolls for shaping the tubing in accordance with the invention.

Referring to the drawings in further detail, FIGS. 1 and 1a are illustrative of the prior art, wherein rolls 15, 16 of a tube mill, for example those for pressing the edges of a gap in the tubing into welded relation at a weld point w, as well as other rolls, must have peripheral grooves with radii corresponding to the tubing being formed, and if the tubing is of another or larger diameter, such as shown in FIG. 1a, for example, then if the same mill is to be used, it must be taken apart and the rolls removed and replaced by rolls as at 15a, 16a with grooves having greater radii.

However, as will now be explained in connection with FIG. 2, and subsequent views, this difficulty is avoided, and the same rolls may be ued to make tubing having a variety of different total perimeters. Three examples of different sizes of tubing are indicated in cross-section in FIGS. 8, 9 and 10, at 17, 18 and 19, respectively. While such tubing is formed with longitudinally-extending opposed flattened top and bottom areas which are of different widths for larger or smaller tubing, yet the side portions of these forms of tubing are all substantially semicircular in cross-section, with the same radii for all. The formation of the tubing in such flattened forms is not a handicap in many cases, particularly as where the tubing is to be subsequently severed into lengths, as for forming can bodies or other purposes. The flattened tubing may more readily thus be severed, and the tube lengths again expanded to the desired cross-section thereafter.

Reverting to FIG. 2, a strip of the flexible tube-forming sheet material is indicated at 20, being drawn from a roll 21 thereof, either, if desired, by any form of pull rolls or, if preferred, directly by an initial set of forming rolls at 22, 23 and 22', 23'. (It will be understood that these rolls and certain of the others, if desired, may be suitably driven by means not shown, while some may comprise idler rolls.) As shown in the cross-sectional view of FIG. 3, these rolls have surfaces so shaped as to shape the strip to define the bottom flattened area 24 of the desired tubing, whereas the sides of the strip are preferably caused to be deflected so as to extend vertically, as indicated at 25, 26, these vertical portions being connected to the flattened portion 24 by curved portions 27, 27', having radii preferably about equal to that of the radius of the semicircular portions of the desired tubing which is ultimately to be formed. The rolls 22, 23 and 22', 23' are mounted respectively on shafts 28 and 29 and so as to be adjustable longitudinally along said shafts. For example, the rolls may be formed with hubs having setscrews 30, which may be simply loosened while the positions of the rolls are shifted, and then tightened to affix the rolls into a new position with a different spacing therebetween, and so as to form tubing of a different size. As shown in FIG. 3a, these rolls have been slidably adjusted toward each other so as to form tubing of smaller dimensions having a narrower flattened bottom area 24a and correspondingly lower vertical portions 25a and 26a. Yet the curved portions 27a, 27a' will remain the same as the curved portions 27, 27' in FIG. 3. Reverting to FIG. 2, the tube-forming strip may next be brought into engagement with a further set of forming rolls 31, 32 and 31', 32', as best shown in the cross-sectional view of FIG. 4. These have surfaces so shaped as to turn inwardly the vertical portions of the strip to angular positions, such as shown at 33 and 34, yet the flattened base portion 24 will remain as before. The portions 33, 34 will be connected to the base portion by curved portions as at 35, 35', the curvature being of the same radius as the portions 27, 27' above referred to. When a tube of smaller dimensions is to be made, this set of rolls may be adjusted into more closely-spaced relation as shown in FIG. 4a, where the portions of the tube metal are shaped as indicated at 24a, 33a and 34a, but the curved portions 35a, 35a' will be of the same radius as the portions 35, 35' in FIG. 4.

Next the tube strip passes another set of rolls 36, 36', 37, 38 and 38', as best shown in the cross-sectional view of FIG. 5. Here the rolls 36 and 38, 36' and 38' are shaped substantially to complete the semicircular cross-sectional side portions of the tubing with radii substantially equal to the predetermined desired radius of these portions of the finished tubing. Roll 37 has a fin 37' engaging between the edges 39 and 40 of the tube metal at some distance prior to the location where these edges are to become fixed together to form a longitudinal seam.

In FIG. 5a, rolls 38a and 38a' are shown adjusted into a more close relation to accommodate the small tubing here being made. The roll 37 with its fin 37' may be the same as in FIG. 5, but rolls 36, 36' in some cases may be here omitted. In any event, the semi-arcuate cross-sectionally shaped side portions of the tubing will be of the same radius as shown in the previously described views.

As the substantially formed tubing further advances, it may pass a support 41, extending down in the gap between the edges 39 and 40, for carrying a mandrel means 42 extending within the tubing forwardly, preferably to or beyond the point where the longitudinal seam is to be formed. Next the tubing may pass a seam-guide member 43, extending down into the gap between said edges. This member may be of insulating material and serves to maintain the gap with a predetermined width. Finally the tube may pass the point where the longitudinal seam is to be formed, which will be the weld point in case the seam is to be formed by welding, and here opposed pressure rolls 45 and 46 are provided at each side of the weld point, these having grooves 47, as best shown in the sectional view of FIG. 6. Such grooves have arcuately-shaped configurations, with radii corresponding to the radius at the external surface of the curved edge portions of the desired tubing, and these rolls, as in the case of the other rolls hereinabove described, do not have to be changed to accommodate flattened tubing of different sizes. Instead, it is merely necessary to adjust in horizontal directions the positions of the shafts 48, 49 which carry same, as indicated by the arrows thereon. This may be accomplished by any suitable mounting means for these shafts, the specific constructions of which may differ as may be desired by those skilled in the art.

The arrangement of the rolls in FIG. 6 is particularly adapted for forming a welded seam of the mashed lapped type indicated at the weld point w in this figure. To accomplish this purpose, a lower roll 50 inside the tubing may be carried on the mandrel means 42 and an upper roll 51 may be suitably mounted to engage the upper surface of the desired seam area. It is evident that neither the mandrel nor the rolls 50 and 51 need be changed or changed in position in order to accommodate tubing of the various sizes such as shown in FIGS. 8 to 10.

FIG. 6a is a view like FIG. 6, except showing the arrangement with rolls, as at 45', 46' adjusted horizontally to more closely-spaced positions as compared with the rolls 45, 46 of FIG. 6, in order to accommodate smaller-sized tubing.

FIG. 7 is a view corresponding to that of FIG. 6, but illustrating an arrangement of rolls 52, 53 corresponding to rolls 45, 46 above described, but with rolls as at 54, 55 of a type adapted for pressing against the metal at the region of the weld point w in cases where there is to be formed a butt-welded seam. FIG. 7a is the same as FIG. 7, except that here the side rolls are shown as adjusted in more closely-spaced relation for forming tubing of a smaller size.

The heating of the metal for welding purposes may be accomplished as by the use of high frequency current from a source indicated at 56 in FIG. 2, the terminals of which are connected to contacts 57, 58, applied to opposite sides of the gap between the edges 39, 40 at points shortly in advance of the weld point, so that the current will flow from these contacts to and from the weld point, causing the edges to become more or less rapidly heated up to the welding temperature upon arriving at the weld point. The current may be of a frequency in the neighborhood of 50,000 cycles, but preferably much higher, for example in the range of 300,000 to 400,000 cycles or higher.

However, as hereinabove noted, various aspects of the invention may be utilized in connection with tube mills wherein the longitudinal seam is formed by other methods, for example, by induction heating or even by mechanical seam-forming expedients of known type.

The apparatus has been above described as applied to cases wherein the tube is shaped or formed by the use of rolls with suitable contours. It will be understood, however, that, in some cases, particularly where the tube metal is quite thin and yielding, it may be less expensive or more desirable to substitute for certain or all of the forming rolls, die means, such as indicated in FIG. 11 at 60 and 61, suitably shaped interiorly to correspond to the different portions of the desired tube metal shapes, as same are being formed.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus adjustable for forming from flexible sheet material, tubing of various different dimensions, comprising in combination: a plurality of pairs of opposed tube forming rolls for engaging an advancing strip of said material while deflecting the opposite side portions thereof around to form generally flattened oval cross-sectional shaped tubing having opposed longitudinally-extending and generally flattened areas, one of which embodies the strip edges; and means for forming a longitudinal seam joining said edges to thereby complete the tubing of said shape, said rolls being shaped to form substantially arcuate portions of a predetermined radius and constituting the sides of the tubing interconnecting the sides of said flattened portions, said rolls being adjustable along their axes respectively to differently spaced-apart positions to form such tubing having its said opposed flattened areas of different widths but interconnected in each case by such arcuate cross-sectional portions having said predetermined radius.

2. Apparatus adjustable for forming from flexible sheet material, tubing of various different dimensions, comprising in combination: a plurality of pairs of opposed tube forming and shaping elements for engaging an advancing strip of said material while deflecting the opposite side portions thereof around to form a generally flattened oval cross-sectional shaped tubing having opposed longitudinally-extending and generally flattened areas, said elements being shaped to form substantially arcuate portions of a predetermined radius and constituting the sides of the tubing interconnecting the sides of said flattened portions, said elements being adjustably mounted for movement respectively to differently spaced-apart positions to form such tubing having its said opposed flattened areas of different widths but interconnected in each case by such arcuate cross-sectional portions having said predetermined radius.

3. Apparatus in accordance with the foregoing claim 1 and in which the means for forming said seam comprises high frequency current means for heating the strip edges to welding temperature, and opposed pressure rollers being provided for bringing said heated edges into welded relation at a weld point, said pressure rollers being shaped to embrace said arcuate portions on the tubing of said predetermined radius and said rolls being adjustable respectively to differently spaced-apart positions to accommodate tubing having said flattened areas of different widths.

4. Apparatus in accordance with the foregoing claim 3, and in which additional rolls in fixed positions are provided above and beneath the weld point for pressing the tube edges into lap-welded relation.

5. Apparatus adjustable for forming from flexible sheet material tubing of various different sizes, comprising in combination: a plurality of sets of tube forming rolls for engaging an advancing strip of said material while deflecting side portions thereof around to form generally flattened oval cross-sectional shaped tubing thereof having opposed longitudinally-extending and generally flattened wall areas with portions of generally arcuate cross-section of predetermined radii and constituting the sides of the tubing interconnecting the sides of said flattened portions, one of said sets of rolls being shaped to bend the sides of said strip to form generally upstanding portions while leaving a central portion of the strip in generally flat condition to provide one of said longitudinally-extending flattened areas of a predetermined width with said upstanding portions connected thereto by curved cross-sectional portions of substantially said predetermined radii, another of said sets of rolls being shaped to then bend said upstanding portions inwardly toward each other and while same remain connected to said flat portion by curved cross-sectional portions of substantially said predetermined radii, another of said sets of rolls being shaped to further bend said formerly upstanding portions to positions for forming the other of said longitudinally-extending flattened areas but with a narrow gap between the edges thereof, opposed rolls in each of said sets being adjustable along their axes respectively to differently spaced-apart positions to form such tubing having said opposed flattened areas of different widths but interconnected in each case by such curved cross-sectional portions having said predetermined radii.

6. Apparatus in accordance with the foregoing claim and in which following said sets of rolls a pair of opposed pressure rollers are provided for pressing against the sides of the formed tubing thereby to bring said edges into seam forming relation, said pressure rollers being formed with grooves having curved surfaces substantially conforming to said curved cross-sectional portions of the tubing of said predetermined radii and said pressure rollers being adjustable to differently spaced-apart positions to accommodate tubing on which the flattened areas are of different widths.

References Cited by the Examiner
UNITED STATES PATENTS

| | | | |
|---|---|---|---|
| 1,534,133 | 4/1925 | Murray | 219—59 |
| 2,922,020 | 1/1960 | Andrew | 219—67 |

RICHARD M. WOOD, *Primary Examiner.*